US008108132B2

(12) United States Patent
Reinke

(10) Patent No.: US 8,108,132 B2
(45) Date of Patent: Jan. 31, 2012

(54) COMPONENT VIBRATION BASED CYLINDER DEACTIVATION CONTROL SYSTEM AND METHOD

(75) Inventor: Paul E. Reinke, Rochester Hills, MI (US)

(73) Assignee: GM Global Technology Operations LLC

( * ) Notice: Subject to any disclaimer, the term of this patent is extended or adjusted under 35 U.S.C. 154(b) by 896 days.

(21) Appl. No.: 12/029,669

(22) Filed: Feb. 12, 2008

(65) Prior Publication Data

US 2009/0177371 A1 Jul. 9, 2009

Related U.S. Application Data

(60) Provisional application No. 61/018,956, filed on Jan. 4, 2008.

(51) Int. Cl.
*G06F 19/00* (2011.01)

(52) U.S. Cl. ...... 701/111; 701/112; 123/481; 123/198 F

(58) Field of Classification Search ............... 123/191.1, 123/192.2, 480, 481, 198 D, 198 DB, 198 F, 123/198 DC, 334; 701/101–104, 106, 110, 701/111, 112, 115

See application file for complete search history.

(56) References Cited

U.S. PATENT DOCUMENTS

| | | | | |
|---|---|---|---|---|
| 3,440,603 | A * | 4/1969 | Cochran | 340/439 |
| 3,682,001 | A * | 8/1972 | Kitamura et al. | 73/492 |
| 3,709,338 | A * | 1/1973 | Glen | 477/192 |
| 3,788,149 | A * | 1/1974 | Wilner | 73/514.12 |
| 4,023,864 | A * | 5/1977 | Lang et al. | 303/20 |
| 5,418,858 | A * | 5/1995 | Shoureshi | 381/71.2 |
| 7,140,355 | B2 * | 11/2006 | Michelini et al. | 123/481 |
| 7,292,932 | B1 * | 11/2007 | Ledger et al. | 701/110 |
| 2008/0276897 | A1 * | 11/2008 | Petridis et al. | 123/192.2 |

* cited by examiner

*Primary Examiner* — Stephen K Cronin
*Assistant Examiner* — Raza Najmuddin

(57) ABSTRACT

A method of changing an active cylinder count of an engine may include determining a vehicle vibration limit and a vehicle vibration level. The cylinder count may be modified (increased or decreased) based upon the vehicle vibration limit and the vehicle vibration level. The vehicle vibration limit may be based upon a vehicle speed, and a coolant temperature of the engine. The vehicle vibration level may be based upon at least one of a desired torque of the engine and a number of active cylinders of the engine. According to other features, the vehicle vibration level may be based upon a measured vibration level of a vehicle component.

13 Claims, 3 Drawing Sheets

COMPONENT VIBRATION BASED CYLINDER DEACTIVATION CONTROL SYSTEM AND METHOD

CROSS-REFERENCE TO RELATED APPLICATIONS

This application claims the benefit of U.S. Provisional Application No. 61/018,956, filed on Jan. 4, 2008. The disclosure of the above application is incorporated herein by reference.

FIELD

The present disclosure relates to control of internal combustion engines, and more specifically to cylinder deactivation control systems and methods based on a component vibration level.

BACKGROUND

The statements in this section merely provide background information related to the present disclosure and may not constitute prior art.

Internal combustion engines may be operable at a full cylinder operating mode and a cylinder deactivation operating mode. In such engines, a number of cylinders may be deactivated (non-firing) during low load conditions. For example, an eight cylinder engine may be operable using all eight cylinders during the full cylinder mode and may be operable using only four cylinders during the cylinder deactivation mode.

Operating the engine in the cylinder deactivation mode during low load conditions may reduce overall fuel consumption of the engine. However, in some cases, operation of the engine in the cylinder deactivation mode may lead to undesirable vehicle vibration. The magnitude of the vibration level is related to the torque of the engine (peak pressure of the cylinders). When a vibration frequency matches a natural frequency of a component, and the magnitude of the vibration is enough to initiate sympathetic vibration, the component may begin to vibrate.

SUMMARY

A method of modifying an active cylinder count of an engine may include determining a vehicle vibration limit and a vehicle vibration level. The active cylinder count may be modified based on the vehicle vibration limit and the vehicle vibration level. According to one example, the vehicle vibration level may be based upon vehicle speed (KPH), a number of active cylinders of the engine, and a desired torque of the engine. The vehicle vibration limit may be based upon the engine RPM and a coolant temperature of the engine.

A control module may include a vibration limit module, a vibration level module and a cylinder transition module. The vibration limit module may determine a vibration limit based upon the vehicle speed (KPH), and a coolant temperature of the engine. The vibration level module may determine a vibration level based upon at least one of a desired engine torque and the engine RPM. The cylinder transition module may determine a desired activated cylinder count based upon the vibration limit and the vibration level. Based upon the determination, the control module may activate or deactivate cylinders of the engine. According to additional features, the vibration module may determine the vibration limit based upon a signal from a user actuated economy switch.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
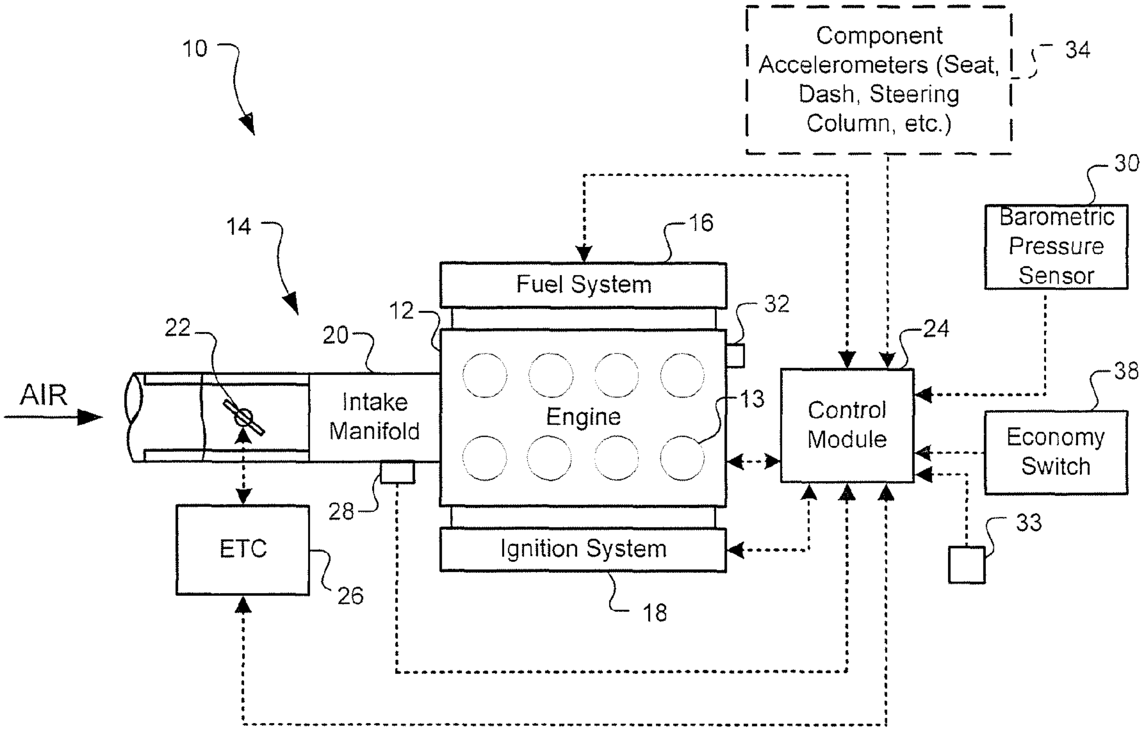
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 is schematically illustrated. Vehicle 10 may include an engine 12 in communication with an intake system 14, a fuel system 16, and an ignition system 18. The engine 12 may be selectively operated in a full cylinder mode and a cylinder deactivation mode. The cylinder deactivation mode of the engine 12 may generally include operation of the engine 12 firing less than all of the cylinders. For example, if the engine 12 includes eight cylinders 13, full cylinder mode operation includes operation of the engine 12 firing all eight cylinders 13 and cylinder deactivation mode generally includes operation of the engine 12 firing less than eight cylinders 13, such as four cylinder operation of the engine 12.

The intake system 14 may include an intake manifold 20 and a throttle 22. The throttle 22 may control an air flow into the engine 12. The fuel system 16 may control a fuel flow into the engine 12 and the ignition system 18 may ignite the air/fuel mixture provided to the engine 12 by the intake system 14 and the fuel system 16.

The vehicle 10 may further include a control module 24 and an electronic throttle control (ETC) 26. The control module 24 may be in communication with the engine 12 to monitor an operating speed thereof and a number and duration of cylinder deactivation events. The control module 24 may additionally be in communication with the ETC 26 to control an air flow into the engine 12. The ETC 26 may be in communication with the throttle 22 and may control operation thereof. A manifold absolute pressure sensor 28 and a barometric pressure sensor 30 may be in communication with the control module 24 and may provide signals thereto indicative of a manifold absolute pressure (MAP) and a barometric pressure ($P_{BARO}$), respectively. An engine coolant sensor 32 may communicate a signal to the control module 24 indicative of an engine temperature. A vehicle speed sensor 33 may communicate a signal to the control module 24 indicative of a vehicle speed (KPH).

According to various embodiments, component accelerometers, collectively referred to at reference 34 may be in communication with the control module 24 and may provide signals thereto indicative of component acceleration. The component accelerometers 34 may be accelerometers mounted to various components in the vehicle such as a vehicle dashboard, a vehicle seat track, a steering column and/or other components. In one example, the accelerometers 34 may measure real-time acceleration and communicate signals to the control module 24 indicative thereof. The accelerometers 34 may each be configured to communicate acceleration measurements along multiple axes (such as along the x, y, and z axes etc.).

An economy switch 38 may be in communication with the control module 24 and may provide a signal thereto. The economy switch 38 may be any switch that may communicate an "ON" and "OFF" status. As will be described, the economy switch 38 may be a user actuated switch that allows for increased acceptable values of vibration in the vehicle without modifying an active cylinder count of the engine 12. The economy switch 38 may be switched to the "ON" position to improve fuel economy. It is appreciated that the economy switch 38 may take other forms such as a button for example, or other device that can receive an operator input.

Figure 2:
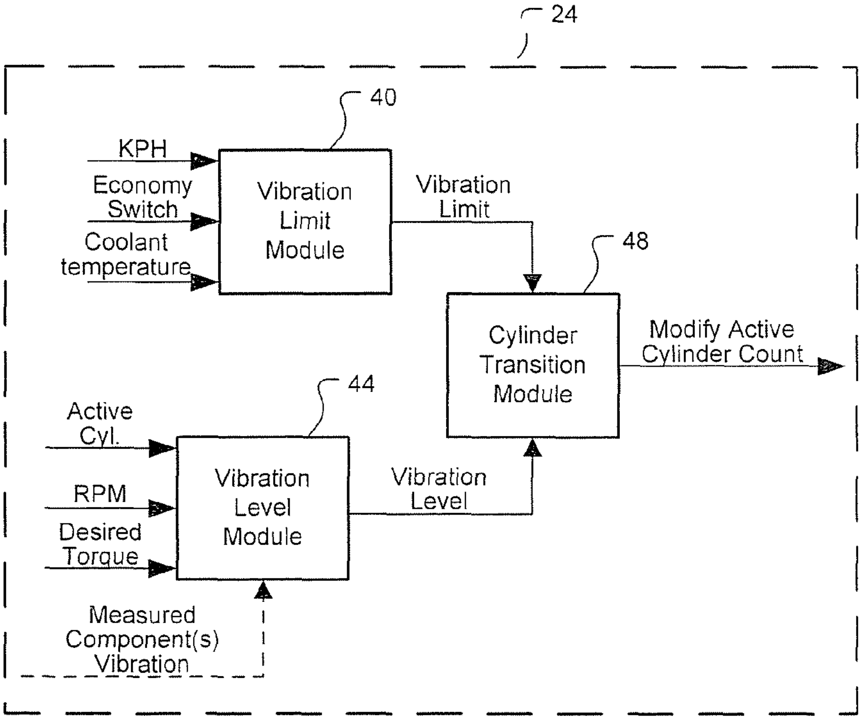
FIG. 2 is a block diagram of the control module shown in FIG. 1.

With reference now to FIG. 2, the control module 24 will be described in greater detail. The control module 24 may include a vibration limit module 40, a vibration level module 44 and a cylinder transition module 48. The vibration limit module 40 may determine a vibration limit based upon at least one of a vehicle speed (KPH), a signal from the economy switch 38 and a coolant temperature.

According to a first implementation, the vibration level module 44 may determine a vibration level based upon an active cylinder count (e.g. the amount of cylinders 13 being fired in the engine 12), the RPM of the engine 12, and a desired torque. According to a second implementation, the vibration level module 44 may determine a vibration level based upon signals received from the component accelerometers 34. Again, the component accelerometers 34 may be provided at desired locations in the vehicle such as at the vehicle seat track, the dashboard, the steering column or elsewhere in the vehicle. It is appreciated that the vibration level module 44 may determine a vibration level based on a combination of inputs from the first implementation and the second implementation. The cylinder transition module 48 may modify the active cylinder count of the engine 12 based upon the vibration limit and the vibration level.

Figure 3A:
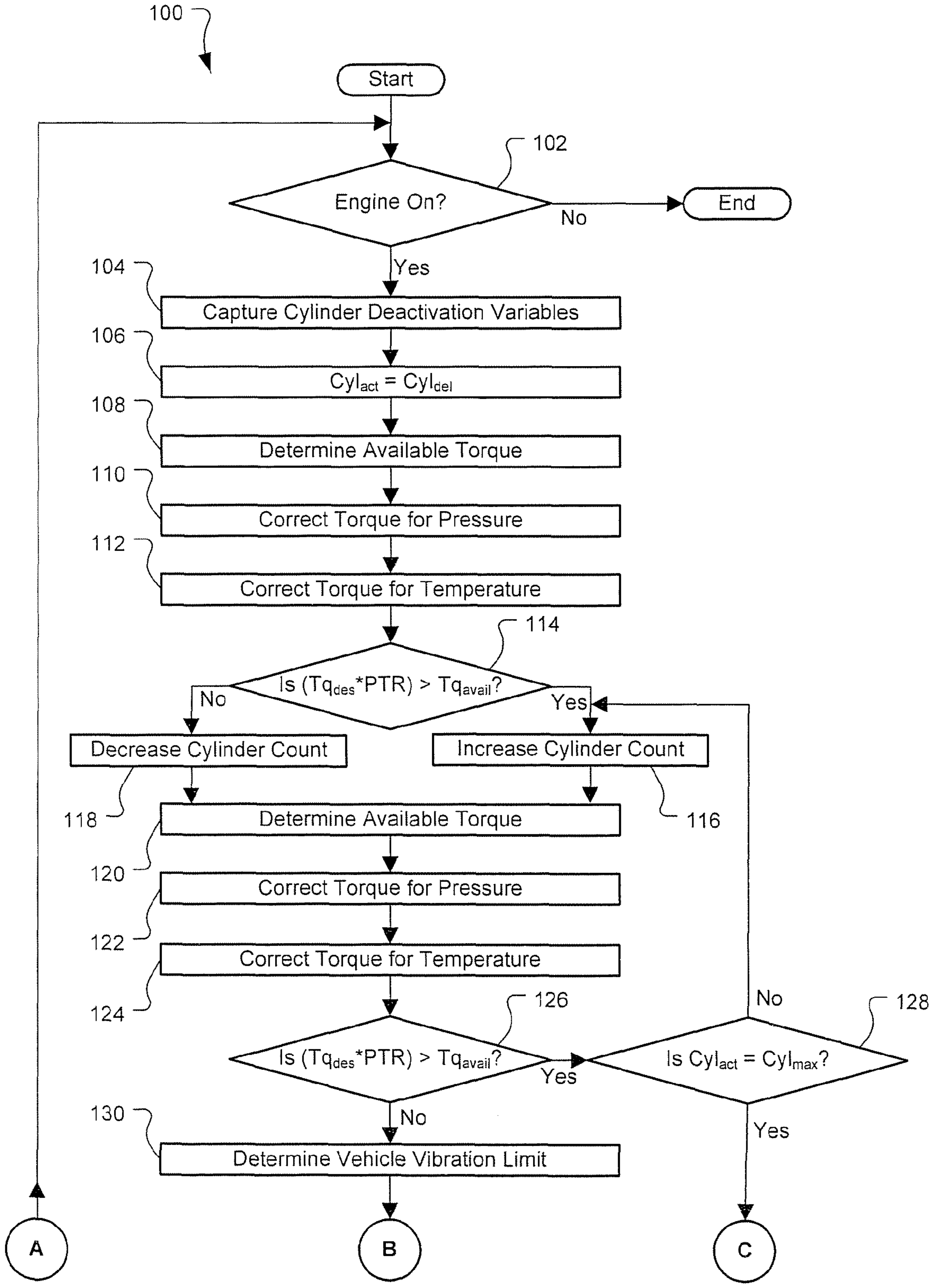
FIGS. 3A and 3B are a control diagram illustrating steps for controlling the amount of active cylinders according to the present disclosure.
Figure 3B:
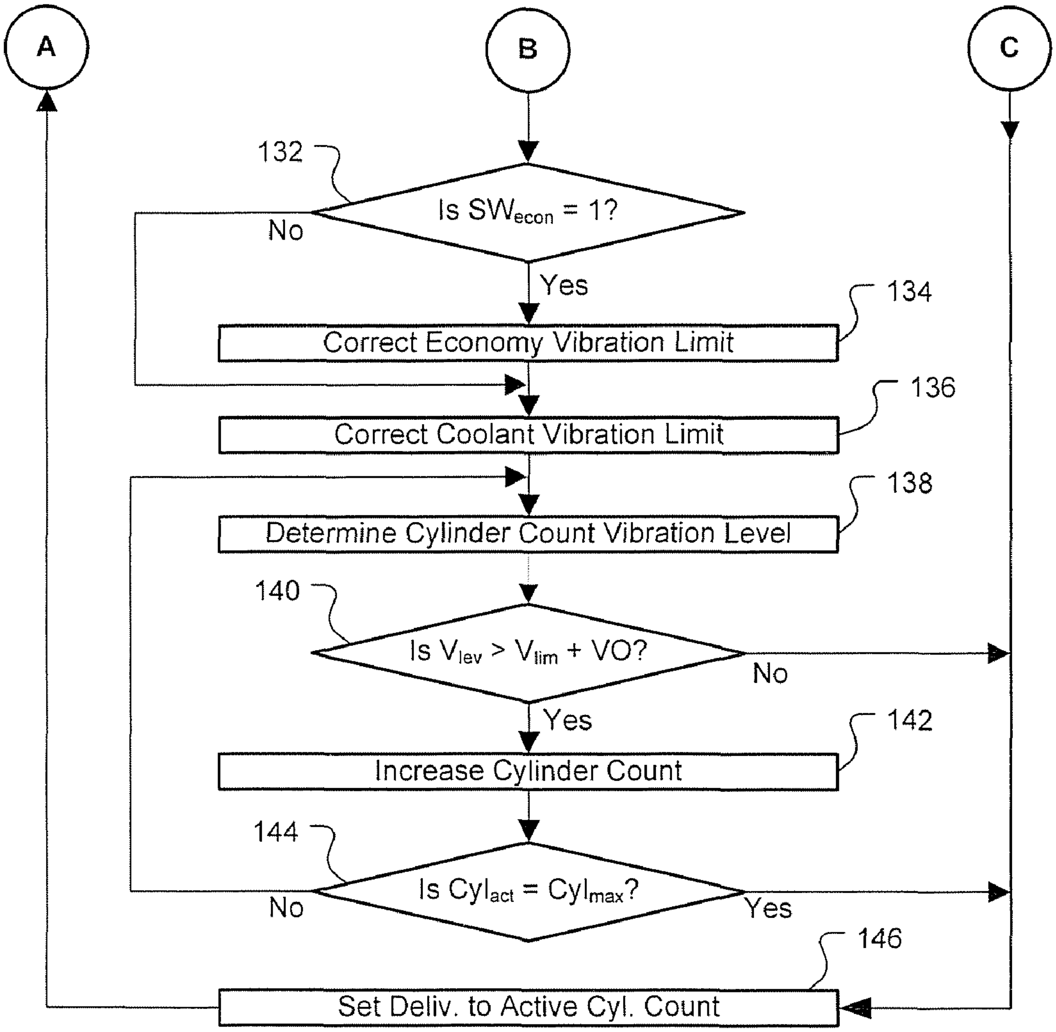

With reference to FIGS. 3A and 3B, control logic 100 for controlling an amount of active cylinders of the engine 12 based on a component vibration level is illustrated. Control logic 100 may begin in step 102 where control determines if the engine 12 in on. If the engine 12 is operating, control captures cylinder deactivation variables in step 104. The cylinder deactivation variables may include Engine RPM ($N_{eng}$), Engine Torque Actual ($Tq_{act}$), Engine Torque Desired ($Tq_{des}$), Vehicle Speed (KPH), Economy Switch State ($SW_{econ}$), Cylinder Count Delivered ($Cyl_{del}$), Inlet Air Temperature ($T_{inlet}$), Barometric Pressure ($P_{baro}$), Engine Coolant Temperature ($T_{coolant}$). In step 106, control sets an activated cylinder count to a delivered cylinder count.

In step 108, control determines the available torque at standard state (1 Bar, 25° C.). The available torque at standard state may be a function of activated cylinders and an engine RPM. The available torque at standard state may be represented as follows:

$$Tq_{avail@std}=F(Cyl_{act},N_{eng}) \quad (1)$$

In step 110, control compensates the available torque based upon atmospheric pressure measured by the barometric pressure sensor 30. The compensated torque may be represented by the following equation:

$$Tq_{avail@25C}=Tq_{avail@std}*(P_{baro}/101.3) \quad (2)$$

In step 112, control compensates the available torque based upon an ambient temperature. The compensated torque may be represented by the following equation:

$$Tq_{avail}=Tq_{avail@25C}*(298/(T_{inlet}+273)) \quad (3)$$

In step 114, control determines if a desired torque is greater than the available torque. The determination may be represented as follows where PTR is a percent torque reserve. The PTR may be used to implement a buffer such that the available torque may be slightly greater than the desired torque.

$$(Tq_{des}*\mathrm{PTR})>Tq_{avail}? \quad (4)$$

If a product of the desired torque and the PTR is greater than the available torque, the cylinder count is increased in step 116. If not, the cylinder count is decreased in step 118.

In step 120, control determines the available torque at standard state (1 Bar, 25° C.). The available torque at standard state may be a function of activated cylinders and an engine RPM. The available torque at standard state may be represented by equation (1) above.

In step 122, control compensates the available torque based upon atmospheric pressure measured by the barometric pressure sensor 30. The compensated torque may be represented by equation (2) above.

In step 124, control compensates the available torque based upon an ambient temperature. The compensated torque may be represented by equation (3) above.

In step 126, control determines if a desired torque is greater than the available torque using equation (4) above.

If the desired torque is greater than the available torque, control determines if the activated cylinders are equal to the maximum number of cylinders in the engine 12 in step 128. If the activated cylinders are equal to the maximum number of cylinders, control loops to step 146. If the activated cylinders are not equal to the maximum number of cylinders, control loops to step 116. If the desired torque is not greater than the available torque in step 126, control determines a vehicle vibration limit in step 130. The vehicle vibration limit may be a function of vehicle speed (KPH). The vehicle vibration limit may be represented as follows:

$$V_{lim}=F(\mathrm{KPH}) \quad (5)$$

In step 132, control determines if the economy switch 38 is in the "ON" or active position. If the economy switch 38 is active, control corrects the economy vibration limit in step 134. The corrected vibration limit may be represented by the following equation where EVM is a calibration variable:

$$V_{lim}=V_{lim}*EVM \quad (6)$$

As described above, when the economy switch 38 is active, the vibration limit is increased by a correction factor ($F_{economy}$). The $F_{economy}$ can be calibrated to satisfy any allowable vibration limit. The corrected vibration limit may be represented by the following equation:

$$V_{lim}=V_{lim}*F_{economy} \quad (7)$$

In some instances, a vehicle operator may wish to tolerate increased vibration in order to gain fuel economy. By increasing a tolerance of the vibration limit (active economy switch 38), control may continue operation of the engine 12 with a reduced active cylinder count, thus increasing fuel economy.

In step 136, control compensates the vibration limit based upon a coolant temperature of the engine 12. The compensated vibration limit may be represented by the following equation:

$$V_{lim}=V_{lim}*(F(T_{coolant})) \quad (8)$$

In step 138, control determines a vibration level. According to one example, control may implement an open loop control to determine a vibration level. In open loop control, the vibration level may be determined as a function of engine RPM, engine torque, and a number of active cylinders. The vibration level, therefore, may be determined from a 4D lookup table. The vibration level may be represented as follows:

$$V_{lev}=F(Cyl_{act}, N_{eng}, Tq_{des}) \quad (9)$$

According to one example, a vibration map may be generated by instrumenting individual driver compartment components (steering column, driver seat track, dashboard, etc.) with accelerometers 34 and operating the vehicle such that the engine 12 goes through a full range of RPM and engine torque. The cylinders 13 may be locked in a particular state (e.g., 5 cylinder state for an 8 cylinder engine) and a unique vibration map may be generated for each active cylinder state. A weighted RMS average vibration (explained in more detail below) may be calculated from outputs of all of the accelerometers 34. An "x-y-z" scatter plot may be generated for each cylinder count. The scatter plots may be used to generate a 3D table, where the component vibration is a function of engine RPM and engine torque. In such an example, the accelerometers 34 are only used during testing to generate the 4D lookup tables for each active cylinder state.

According to another example, control may implement a closed loop control to determine a vibration level. In closed loop control, control may determine a real-time vibration level based on the signals from the accelerometers 34. As described, the component accelerometers 34 may be provided at desired locations in the vehicle such as at the vehicle seat track, the dashboard, the steering column or elsewhere in the vehicle. In this closed loop control, some or all of the accelerometers 34 may be provided in the vehicle for communicating real-time vibration levels to the control module 24. The accelerometers 34 may provide accelerations in multiple directions (x, y, z etc.).

According to one implementation, accelerometer signals from one or more components may be weighted differently than accelerometer signals from other components. The weighting of accelerometer signals may be used for both of the open loop and closed loop examples described above. As may be appreciated, it may be more important to quantify and react to a vibration level of one component (such as at a vehicle seat track for example) as compared to another component (such as at a vehicle dashboard for example). A weighted RMS component vibration may be represented by the following equation where ST=driver seat track; CA=control arm of a non-driven wheel for compensation for road surface, acceleration and turning; SC=steering column; D=dashboard; x=longitudinal direction; y=lateral direction; z=vertical direction; a,b,c . . . =weighting factors; T=a+b+c . . . .

$$\text{Weighted } RMS=a/T*RMS(STz-CAz)+b/T*RMS(SCy-Cay)+c/T*RMS(SCz-CAz)+d/T*RMS(Dz-CAz)+\ldots$$

In step 140, control determines if the vibration level is greater than the vibration limit using the following expression where VO is a hysteresis constant. VO (vibration offset) is a buffer to decrease the control system business that would occur if level and limit were almost equal. The determination can be represented as follows:

$$V_{lev}>V_{lim}+VO? \quad (10)$$

If the vibration level is not greater than the vibration limit, control loops to step 146. If the vibration level is greater than the vibration limit, control increases cylinder count in step 142. In step 144, control determines if the activated cylinders are equal to the maximum number of cylinders in the engine 12. If the activated cylinders are equal to the maximum number of cylinders, control loops to step 146. If the activated cylinders are not equal to the maximum number of cylinders, control loops to step 138. In step 146, control sets the delivered cylinder count equal to the active cylinder count. Control then loops to step 102.

Those skilled in the art may now appreciate from the foregoing description that the broad teachings of the present disclosure may be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:

determining a vehicle vibration limit based upon at least one of a vehicle speed (KPH), a coolant temperature of the engine and a signal from a user actuated economy switch, wherein the vibration limit is increased by a correction factor based on the signal;

measuring a vehicle vibration level; and modifying an active cylinder count based on the vehicle vibration limit and the vehicle vibration level;

wherein determining the vehicle vibration limit is based upon a signal from a user actuated economy switch, wherein the vibration limit is increased by a correction factor based on the signal.

2. The method of claim 1 wherein measuring the vehicle vibration limit comprises measuring the vehicle vibration level of at least one vehicle component of a plurality of vehicle components including a steering column, a seat track and a dashboard.

3. The method of claim 2 wherein the vehicle vibration level is based upon at least two vehicle components of the vehicle components wherein a vibration level of one of the vehicle components has a first weighting and a vibration level of another of the vehicle components has a second weighting, wherein the first weighting is different than the second weighting.

4. The method of claim 3 wherein the vehicle vibration level of the seat track has the first weighting and the vehicle vibration level of at least one of the steering column and the dashboard have the second weighting, the first weighting being greater than the second weighting.

5. A control module comprising:

a vibration limit module that determines a vibration limit based upon a measured vehicle speed (KPH), a coolant temperature of an engine and an input from a user actuated economy switch;

a vibration level module that determines a vibration level based upon a vibration signal from an accelerometer that measures a vibration level of a vehicle component; and a cylinder transition module that determines a desired activated cylinder count based upon the vibration limit and the vibration level and that modifies an activated cylinder count based on the desired activated cylinder count.

6. The control module of claim 5 wherein the vehicle component comprises at least one of a steering column, a seat track, and a dashboard of a vehicle and wherein the vibration level module determines the vibration level based upon an accelerometer disposed on at least one of the vehicle components.

7. A control module comprising:

a vibration limit module that determines a vibration limit based upon at least one of a measured vehicle speed (KPH), a coolant temperature of an engine and an input from a user actuated economy switch;

a vibration level module that determines a vibration level based upon a measured vibration level of a vehicle component; and a cylinder transition module that determines a desired activated cylinder count based upon the vibration limit and the vibration level and that modifies an activated cylinder count based on the desired activated cylinder count.

8. The control module of claim 7 wherein the vehicle component comprises a steering column.

9. The control module of claim 7 wherein the vehicle component comprises a seat track.

10. The control module of claim 7 wherein the vehicle component comprises a dashboard.

11. The control module of claim 7 wherein the vehicle component includes at least two of a steering column, a seat track, and a dashboard.

12. The control module of claim 7 wherein the vibration level module determines the vibration level based upon at least two vehicle components of the vehicle components wherein a vibration level of one of the vehicle components has a first weighting and a vibration level of another of the vehicle components has a second weighting, wherein the first weighting is different than the second weighting.

13. The control module of claim 6 wherein the vibration level is based upon at least two vehicle components of the vehicle components wherein a vibration level of one of the vehicle components has a first weighting and a vibration level of another of the vehicle components has a second weighting, wherein the first weighting is different than the second weighting.

* * * * *